(12) United States Patent
Dietz

(10) Patent No.: US 6,823,341 B1
(45) Date of Patent: Nov. 23, 2004

(54) METHOD, SYSTEM AND PROGRAM FOR PROVIDING INDEXED WEB PAGE CONTENTS TO A SEARCH ENGINE DATABASE

(75) Inventor: Timothy Alan Dietz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 09/456,076

(22) Filed: Dec. 6, 1999

(51) Int. Cl.[7] ............................................. G06F 17/30
(52) U.S. Cl. ..................... 707/100; 709/203; 709/229; 711/118; 382/219
(58) Field of Search ......................... 707/100; 709/203, 709/229; 711/118; 382/219; 370/338

(56) References Cited

U.S. PATENT DOCUMENTS

| | | | | |
|---|---|---|---|---|
| 5,692,073 A | * | 11/1997 | Cass | 382/219 |
| 5,745,899 A | | 4/1998 | Burrows | 707/102 |
| 5,761,418 A | | 6/1998 | Francis et al. | 395/200.31 |
| 5,765,158 A | | 6/1998 | Burrows | 707/101 |
| 5,806,065 A | | 9/1998 | Lomet | 707/8 |
| 5,845,273 A | | 12/1998 | Jindal | 707/1 |
| 5,864,863 A | | 1/1999 | Burrows | 707/103 |
| 5,941,944 A | * | 8/1999 | Messerly | 709/203 |
| 5,991,810 A | * | 11/1999 | Shapiro et al. | 709/229 |
| 6,141,333 A | * | 10/2000 | Chavez, Jr. | 370/338 |
| 6,286,006 B1 | * | 9/2001 | Bharat et al. | 707/100 |
| 2001/0023476 A1 | * | 9/2001 | Rosenzweig | 711/118 |
| 2001/0026591 A1 | * | 10/2001 | Keren et al. | 375/240.26 |

OTHER PUBLICATIONS

Ardo et al; "Regional Ditributed WWW Search and Indexing Service—the DESIRE Way"; Computer Networks and ISDN Systems; vol. 30, No. 1–7, pp. 173–183; 1998.

Rodriguez et al; "AlephWeb: a Search Engine Based on the Federatedd Structure"; Proceedings of JENC7. 7th Joint European Conference, Networking in the Information Society, pp. 112/1–11210; 1996.

* cited by examiner

Primary Examiner—Charles Rones
(74) Attorney, Agent, or Firm—Leslie A. Van Leeuwen; Dillon & Yudell LLP

(57) ABSTRACT

A method, system and program for providing indexed web page contents to a search engine database. In response to each user request for a web page, user access to the web page is provided from a temporary copy of the web page which is stored on a device which accesses the web page and which is accessible to the user. Indexing data is then automatically recorded at that device from the temporarily stored copy of the accessed web page, wherein the indexing data corresponds to contents of the accessed web page. The indexing data is thereafter transmitted from the device to a remote data storage device which provides a search engine database.

29 Claims, 4 Drawing Sheets

METHOD, SYSTEM AND PROGRAM FOR PROVIDING INDEXED WEB PAGE CONTENTS TO A SEARCH ENGINE DATABASE

BACKGROUND OF THE INVENTION

1. Technical Field

The present invention relates to an improved method, system and program for indexing web page contents, and in particular to an improved method, system and program for providing indexed web page contents to a search engine database. Still more particularly, the present invention relates to a method, system and program for indexing web page contents of each web page requested from the Internet by a user and providing the indexed web page contents to a search engine database.

2. Description of the Related Art

In the prior art, it has been well known that computer systems can be utilized to manage indices of records of databases. Many techniques are known to parse, index, and search databases. However, managing extremely large databases presents special problems.

In recent years, a unique distributed database has emerged in the form of the World-Wide-Web(Web). The database records of the Web are in the form of web pages accessible via the Internet. Here, tens of millions of pages are accessible by anyone having a communications link to the Internet.

The pages are dispersed over millions of different computer systems all over the world. Users of the Internet constantly desire to locate specific pages containing information of interest. However, a current problem with the Web is the lack of ability to search and browse (collectively these activities are referred to as "navigate") the information in the Web. Searching can be described as looking for the resources that contain particular information of interest, such as a specific set of keywords, while browsing is a less focused "looking around."

Currently, it is impossible to efficiently navigate all of the Web. The amount of information available through web pages and other data available through the Internet grows by vast amounts each day. In an effort to provide a directory to data on the Internet, many search engines have been created whereby a user can search web pages by a keyword, phrase, topic, etc. However, each search engine typically only accesses a directory of web pages that have been previously "crawled" or indexed for that search engine or manually created. The indexing data is typically stored in a database which can be searched in various ways to provide users with locations of web pages which may be relevant to a user's particular interest.

With the amount of information on the Internet growing exponentially, there is little chance that the vast majority of the information will be effectively indexed with the techniques utilized today by the various search engine sites that rely on centralized computers accessing and indexing the distributed content of the Internet in a limited manner. This, in turn, leads to the current statistics which estimate that only 15–20% of the information available on the Internet is readily accessible via current search engine indexing methods.

However, users access a multitude of web pages that have not been indexed by any search engine. Therefore, it would be desirable to retrieve index data from each web page that a user accesses over the Internet in order to update search engine databases with pages that have not yet been indexed. Further, it would be desirable to free bandwidth typically utilized to crawl for non-indexed pages and shift to utilizing data retrieved from user accesses. In particular, indexing pages retrieved from user accesses would be both more efficient and potentially allow a derivation of the value of particular web pages based on the number of times indexes of a particular page are returned to a search engine from different users. Effectively, by receiving index data created during user accesses, the creation of a usefulness value for web pages within search engines may be determined.

SUMMARY OF THE INVENTION

In view of the foregoing, it is therefore an object of the present invention to provide an improved method, system and program for indexing web page contents.

It is another object of the present invention to provide an improved method, system and program for providing web page contents to a search engine database.

It is yet another object of the present invention to provide a method, system and program for indexing web page contents of each web page requested from the Internet by a user and providing the indexed web page contents to a search engine database.

In accordance with the method, system and program of the present invention, in response to each user request for a web page, user access to the web page is provided from a temporary copy of the web page which is stored on a device which accesses the web page and which is accessible to the user. Indexing data is then automatically recorded at that device from the temporarily stored copy of the accessed web page, wherein the indexing data corresponds to contents of the accessed web page. The indexing data is thereafter transmitted from the device to a remote data storage device which provides a search engine database. According to one object of the invention, the indexed data is incorporated into the search engine database, such that previously unknown indexed web page contents are provided to a search engine database in response to a user access of that web page. According to another object of the invention, a statistical count of a number of times that indexing data for a particular web page is provided to a search engine database is maintained.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by references to the following detailed description of an illustrative embodiment when read in conjunction with the accompanying drawings, wherein.

DETAILED DESCRIPTION OF THE PREFERRED EMBODIMENT

The present invention may be executed in a variety of systems, including a variety of computers under a number of different operating systems. The computer may be, for example, a personal computer, a network computer, a server, a midrange computer or a mainframe computer. In addition, the computer may be a stand-alone system or part of a network such as a local-area network (LAN) or a wide-area network (WAN). For the purposes of illustration, a preferred embodiment of the present invention, as described below, is implemented on a personal computer, such as the Aptiva series manufactured by International Business Machines Corporation.

Figure 1:
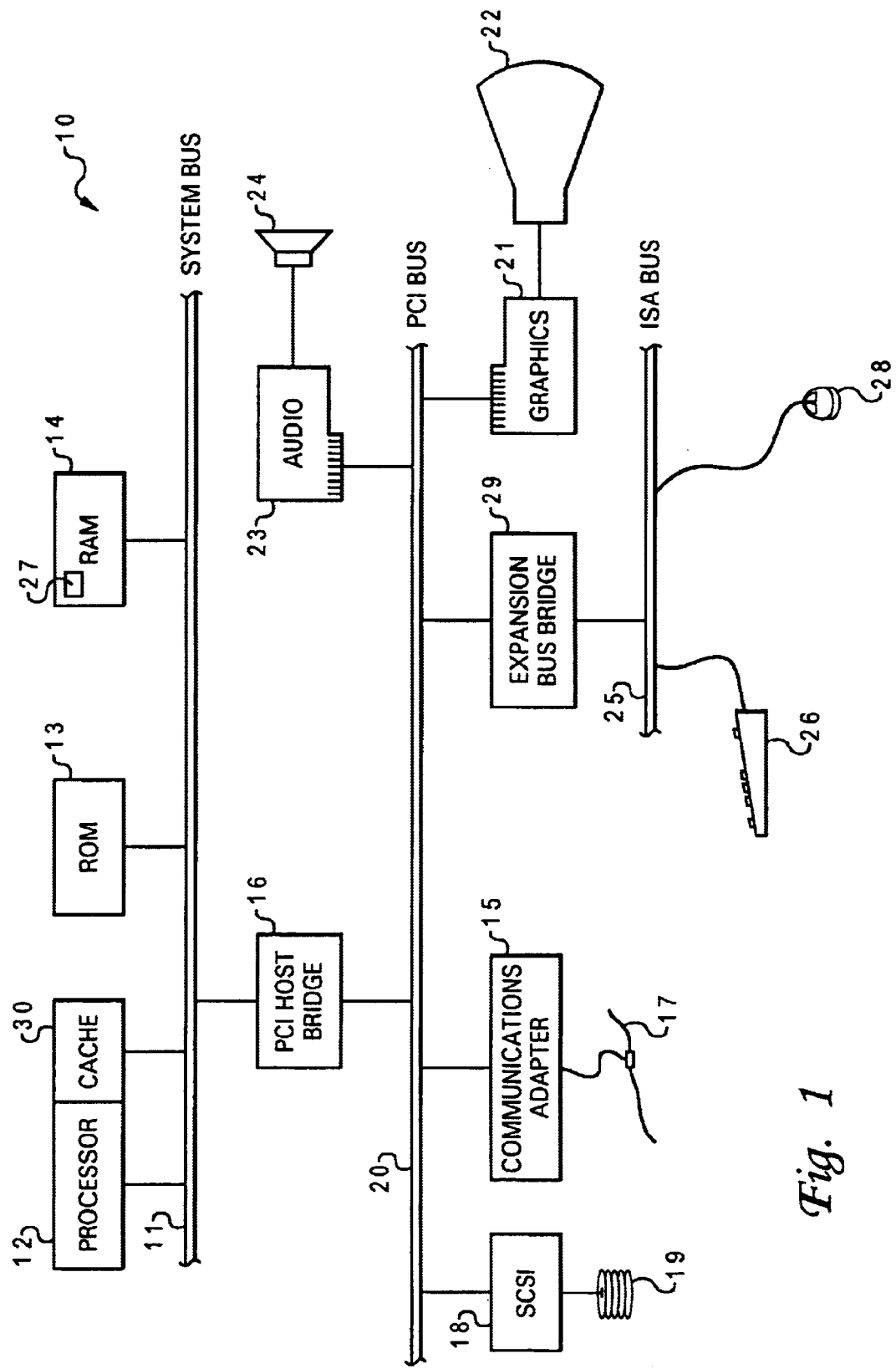
FIG. 1 illustrates a block diagram of a typical computer system that may utilize a preferred embodiment of the present invention.

Referring now to the drawings and in particular to FIG. 1, there is depicted a block diagram of a typical computer system that may utilize a preferred embodiment of the present invention. As shown, a central processing unit (CPU) 12, a cache 30, a read-only memory (ROM) 13, and a Random-Access Memory (RAM) 14 are connected to a system bus 11 of a computer system 10. CPU 12, Cache 30, ROM 13, and RAM 14 are also coupled to a PCI local bus 20 of computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

Also attaching to PCI local bus 20 are communications adapter 15, small computer system interface (SCSI) 18, and expansion bus bridge 29. Communications adapter 15 is for connecting computer system 10 to a network 17. SCSI18 is utilized to control high-speed SCSI disk drive 19. Expansion bus bridge 29, such as a PCI-to-ISA bus bridge, may be utilized for coupling ISA bus 25 to PCI local bus 20. As shown, a keyboard 26 and a mouse 28 are attached to ISA bus 25 for performing certain basic I/O functions. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added.

Computer system 10 also preferably includes an interface such as a graphical user interface (GUI) and an operating system (OS) that reside within machine readable media to direct the operation of computer system 10. Any suitable machine-readable media may retain the GUI and OS, such as RAM 14, ROM 13, SCSI disk drive 19, and other disk and/or tape drive(e.g. magnetic diskette, magnetic tape, CD-ROM, optical disk, or other suitable storage media). Any suitable GUI and OS may direct CPU 12. For example, the AIX operating system is one of IBM's operating systems which may be implemented.

Further, computer system 10 preferably includes at least one software application(e.g. program product) that resides within machine readable media, for example program 27 within RAM 14. The software application may be accessible by an operating system, or may be incorporated into an operating system control program. Preferably, the software application contains instructions that when executed on CPU 12 carry out the operations depicted in the flow chart of FIGS. 3 and 4 and others described herein. In particular, a software application of the present invention will receive a user request for a particular web page address, implement searching of network 17 for the particular web page address, and retrieve data stored for the web page address if available whereby a temporary copy of the data is stored in cache 30. Typical software applications which perform these functions are provided by browsers, proxy servers, and other distributed devices which provide access to the Internet and typically store a temporary copy of any web pages accessed. In particular, a software application of the present invention also retrieves index data for the contents of each temporarily stored web page which is preferably retrieved in response to a user request. The retrieved index data is preferably compressed and transmitted to a location, preferably a data storage device for a search engine, whereby the index data may be translated to a format usable by the search engine database, as will be further described herein.

Figure 2:
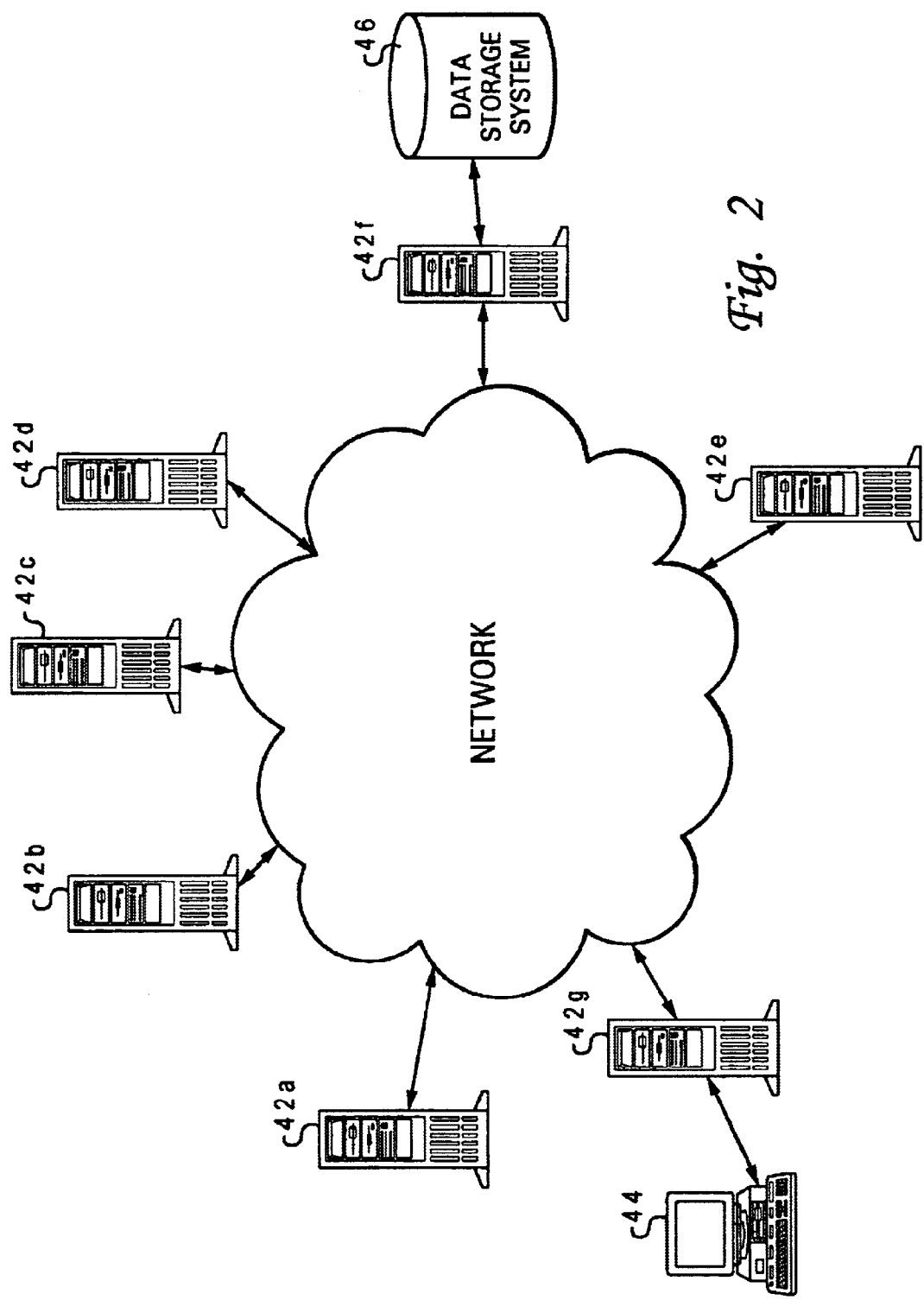
FIG. 2 depicts a block diagram of a general network environment which may be utilized in the implementation of the present invention.

Referring now to FIG. 2, there is depicted a block diagram of a general network environment which may be utilized in the implementation of the present invention. Network environment 40 includes multiple servers 42a–42g which are connected through a network 48, such as the Internet. In general, servers 42a–42g respond to commands from clients. For example, a file server may contain stored web pages. When a client submits a request for a page, the server transfers a copy of the file to the client.

In particular, each of servers 42a–42g may also function as clients within network environment 40. For example, a personal computer 44, connected to network 48 through server 42g may send a command to server 42g for a particular web page. Server 42g is a server to personal computer 44, which is a client. However, server 42g then searches through network 48 for the server containing the requested web page and sends a command to the server, for example server 42a, for the web page. Server 42a is then a server for server 42g, which is a client. Server 42g will temporarily store a copy of the web page retrieved from server 42a. In addition, personal computer 44 will typically store a temporary copy of the retrieved web page, as received from server 42g.

In the implementation of the present invention, for example, server 42g may include an application which retrieves index data from the web page contents of each web page temporarily stored in cache and/or other volatile memory of server 42g. The retrieved index data is then transmitted to a data storage system, such as search engine data storage system 46 which is connected to network 48 by server 42f. In another implementation of the present invention, for example, personal computer 44 may include a browser or other application which also retrieves index data from the web page contents of each web page temporarily stored in cache and/or other volatile memory of personal computer 44. The retrieved data is then transmitted to search engine data storage system 46 or other designate data storage systems. In addition, in the implementation of the present invention, other distributed devices which access network 48, for example each servers 42a–42g, may include a software application which also retrieves index data from the web page contents of each web page temporarily stored in cache and/or other volatile memory of each of servers 42a–42g.

Indexing a full text document is performable by a variety of methods which are well known in the art. Various internet search engines and other software products use differing methods for indexing data. Some of the more common indexing methods are inverted file schemes, such as B+ trees, hashed indexes, signature files and simple keyord-outof-context mechanisms. Preferably, in the present embodiment, web pages are indexed in such a manner that the indexed data is efficient and easily translatable by the various internet search engines into their proprietary format for subsequent use. For example, indexed web page data may be efficiently compressed by a simple inverted file mechanism utilizing a standard compression technique such as LZ or Huffman for transfer, since many times an indexed file's size can exceed the original document size. Upon receipt of the compressed file by a search engine, the compressed indexed data would be decompressed and translated into the format required to be integrated with the rest of the search engines data Indexing data which is provided to data storage system 46 not only provides the search engine data storage system with indexing data for each page which has been accessed by a user, but also the frequency at which particular pages are accessed. Thereby, the indexed data received at data storage system 46 may also be utilized in a statistical manner. By charting the number times the index data for a particular web page is accessed at data storage system 46, a usefulness value which indicates the relative use of a web page may be determined.

Figure 3:
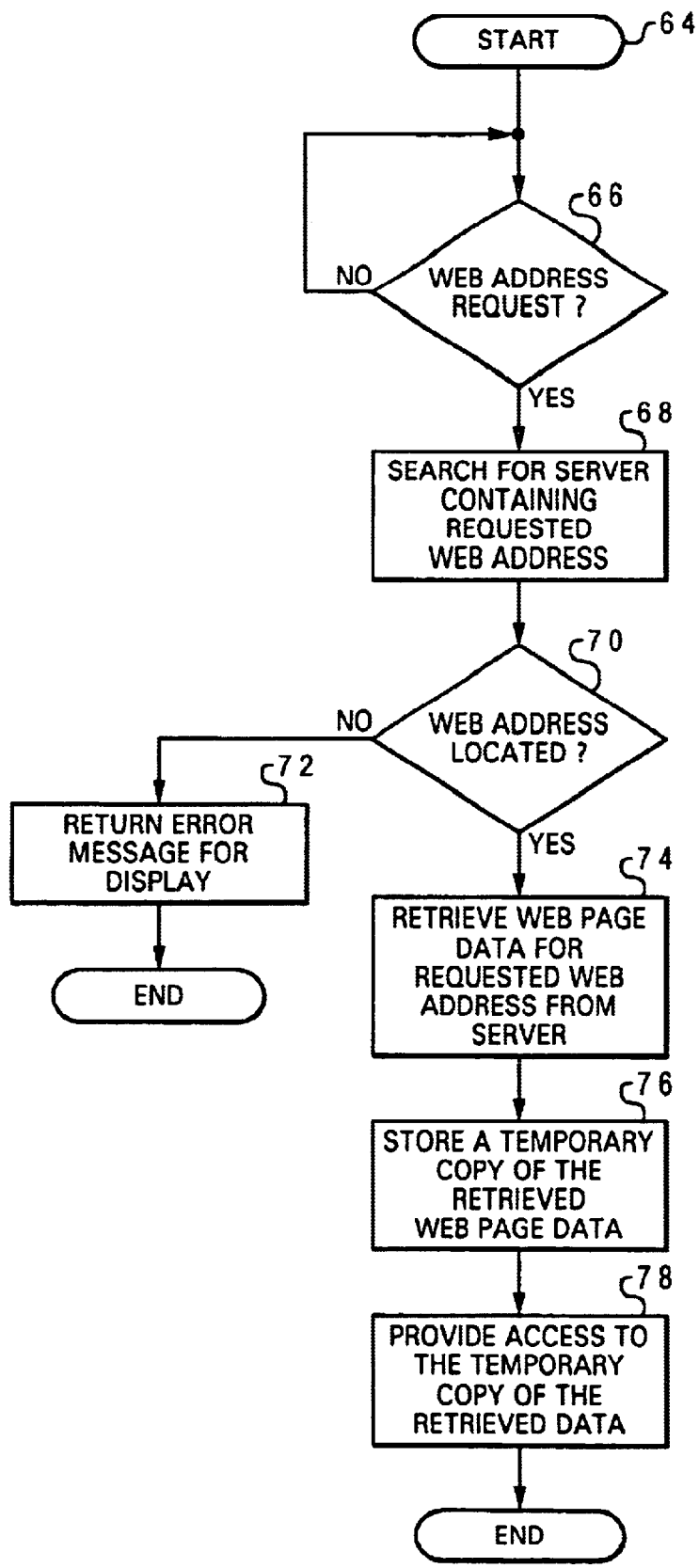
FIG. 3 illustrates a high level logic flowchart of a process for accessing web pages in response to a user request in accordance with the present invention.

With reference now to FIG. 3, there is illustrated a high level logic flowchart of a process for accessing web pages in response to a user request. As depicted, the process starts at block 64 and thereafter proceeds to block 66. Block 66 depicts a determination as to whether a web address is requested from a user. If a web address is not requested, the process iterates at block 66. If a web address is requested from a user, the process passes to block 68. Block 68 illustrates searching the Internet for the server containing the requested web address, as is well known in the art. Thereafter, block 70 depicts a determination as to whether the web address is located. If the web address is not located, the process passes to block 72. Block 72 illustrates returning an error message for display and thereafter the process ends. If the web address is located, the process passes to block 74. Block 74 depicts retrieving web page data for the requested web address from the server. Thereafter, block 76 illustrates storing a temporary copy of the retrieved web page data. Next, block 78 depicts providing access to the temporary copy of the retrieved data and thereafter the process ends.

Figure 4:
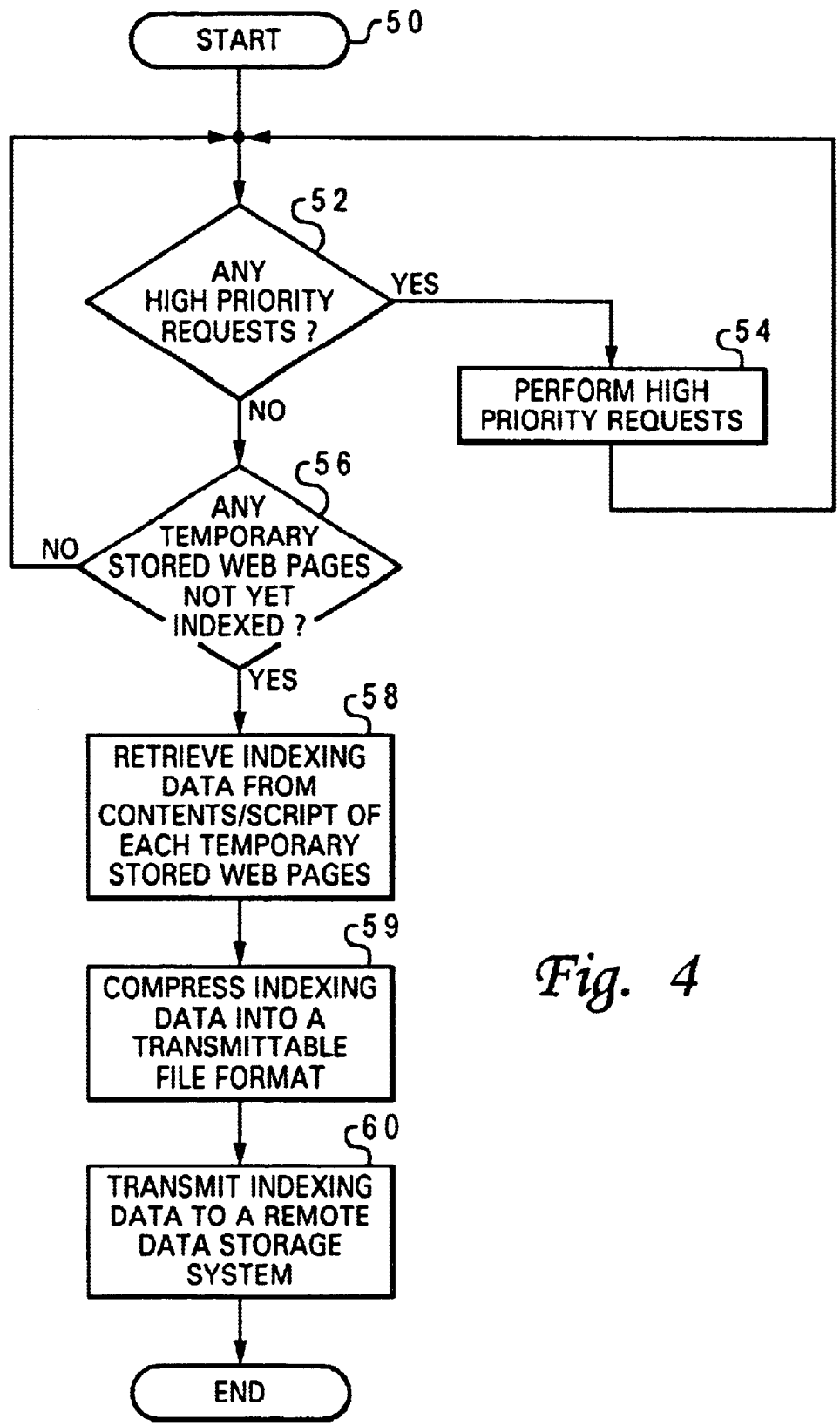
FIG. 4 depicts a high level logic flowchart of a process for acquiring indexed web page contents and providing the indexed web page contents to a search engine database in accordance with the present invention.

Referring now to FIG. 4, there is depicted a high level logic flowchart of a process for acquiring indexed web page contents and providing indexed web page contents to a search engine database. As depicted, the process starts at block 50 and thereafter proceeds to block 52. Block 52 depicts a determination as to whether or not there are any high priority requests. In particular, requests such as accessing a new file, transmitting a temporary file and other such activities may be considered high priority requests. If there are high priority requests, the high priority requests are performed, as illustrated at block 54. If there are not any high priority requests the process passes to block 56. Block 56 depicts a determination as to whether or not any temporarily stored web pages are not yet indexed. If there are not any temporarily stored web pages that are not yet indexed, the process passes to block 52. If there are temporarily stored web pages that are not indexed, the process passes to block 58. Block 58 illustrates retrieving indexing data from textual contents/scripting of each temporarily stored web page. Next, block 59 depicts compressing the retrieved indexing data into a transmittable file format. Thereafter, block 60 illustrates transmitting the compressed indexing data file to a remote data storage system, such as a search engine data storage system, wherein the indexing data can be incorporated into a search engine database and/or utilized for statistical data.

As has been described, the present invention provides a method and system for providing indexed web page contents to a search engine database. In particular, indexed web page contents are retrieved from temporarily stored copies of web pages that have been requested by a user. However, while the invention is described in terms of retrieving web pages from a network such as the Internet, the invention is also applicable for other data available through the Internet. In addition, the invention is not limited to the network known as the Internet, but may be utilized for other networks. For example, the invention is applicable to retrieving indexing data for data files within a network such as an intranet, wherein in response to a user accessing files within an intranet, indexing data for the contents of the files is retrieved from temporarily stored copies of the accessed files and transmitted to a data storage system which incorporates the data into a intranet search engine. Further, it is to be understood that any distributed system which stores a temporary copy of data accessed by a user from a network can be utilized to retrieve indexing data from the temporarily stored copy and transmit the indexing data to a data storage system whereby the indexing data can be incorporated into a searchable database.

It is important to note that, although the present invention has been described in the context of a fully functional computer system, those skilled in the art will appreciate the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communication links.

While the invention has been particularly shown and described with reference to a preferred embodiment, it will be understood by those skilled in the art that various changes in form and detail may be made therein without departing from the spirit and scope of the invention.

What is claimed is:

1. A computer program product, residing on a computer usable medium and having computer usable program means embodied therein, said computer program means comprising:

means for storing a temporary copy of a web page accessed in response to a user request for said web page;

means for automatically recording indexing data from said temporary copy of said web page, wherein said indexing data corresponds to contents of said accessed web page; and means for transmitting said recorded indexing data to a remote data storage device.

2. The computer program product according to claim 1, further comprising:

means for enabling user access to said web page from said temporary copy of said web page.

3. The computer program product according to claim 1, further comprising:

means for compressing said recorded indexing data into a transmittable format.

4. The program according to claim 1, further comprising:

means for collecting recorded indexing data from a plurality of users at a remote data storage system in response to each user access to a web page.

5. A method for providing indexed file contents to a data storage system, said method comprising the steps of:
- providing user access to a data file from a temporary copy of said data file stored on a device which accesses said data file and is accessible to said user, in response to each user request for a data file;
- automatically recording indexing data at said device from said temporarily stored copy of said accessed data file, said indexing data corresponding to contents of said accessed data file; and
- transmitting said indexing data from said device to a remote data storage system.

6. The method for providing indexed file contents to a data storage system according to claim 5, said method further comprising the step of collecting indexed data file contents from a plurality of users at a remote data storage system in response each user access to a data file.

7. A method for providing indexed web page contents to a search engine database, said method comprising the steps of:
- providing user access to a web page from a temporary copy of said web page which is stored on a device which accesses said web page and which is accessible to said user, in response to each user request for a web page;
- automatically recording indexing data at said device from said temporarily stored copy of said accessed web page, wherein said indexing data corresponds to contents of said accessed web page; and
- transmitting said indexing data from said device to a remote data storage device which provides a search engine database.

8. The method for providing indexed web page contents to a search engine database according to claim 7, said method further comprising the step of incorporating said indexed data into said search engine database, such that previously unknown indexed web page contents are provided to a search engine database in response to a user access to said web page.

9. The method for providing indexed web page contents to a search engine database according to claim 7, said step of providing user access to a web page from said temporary copy of said web page further comprising the steps of:
- searching a network through a server, wherein said server requests accesses to said user requested web page;
- temporarily storing a copy of said user requested web page at said server, in response to receiving a copy of said web page at said server; and
- providing said user access to said temporarily stored copy of said user requested web page.

10. The method for providing indexed web page contents to a search engine database according to claim 7, said step of providing user access to a web page from a temporary copy of said web page further comprising the steps of:
- entering a user request for a web page to a browser, wherein said browser is an interface for a user to a network;
- requesting said user requested web page from a network by said browser;
- temporarily storing a copy of said user requested web page in a volatile storage accessible to said browser, in response to receiving a copy of said web page; and
- providing said user access to said temporarily stored copy of said user requested web page through said browser.

11. The method for providing indexed web page contents to a search engine database according to claim 7, said step of providing user access to said web page from a temporary copy of said web page further comprising the step of:
- temporarily storing a copy of a user requested web page in a volatile storage of a distributed data processing system, in response to receiving a copy of said web page due to a user request.

12. The method for providing indexed web page contents to a search engine database according to claim 7, said step of providing user access to a web page from a temporary copy of said web page further comprising the step of:
- accessing said web page from a network.

13. The method for providing indexed web page contents to a search engine database according to claim 7, said step of automatically recording indexing data at said device from said temporarily stored copy of said accessed web page further comprising the steps of:
- determining whether said device has high priority functions to perform;
- retrieving said indexing data at said device from said temporarily stored copy of said accessed web page, in response determining that said device does not have high priority functions to perform; and
- compressing said retrieved indexing data into a transmittable file format.

14. The method for providing indexed web page contents to a search engine database according to claim 7, said method further comprising the step of:
- maintaining a count of a number of times that indexing data for a particular web page is provided to a search engine database.

15. A system for indexing web page contents, said system comprising:
- a device that accesses a web page in response to a user request and stores a temporary copy of said accessed web page, wherein said device is accessible to a user;
- a memory element within said device wherein indexing data from said temporary copy of said accessed web page is automatically acquired and stored, said indexing data corresponding to contents of said accessed web page; and
- a transmitter element that transmits said indexing data from said device to a remote data storage device.

16. The system for indexing web page contents according to claim 15, said system further comprising a collection element that collects said indexing data from a plurality of users at said remote data storage device in response to each user access to a web page.

17. The system for indexing web page contents according to claim 16, said system further comprising an incorporating element that incorporates said collected indexing data into a search engine database.

18. The system for indexing web page contents according to claim 16, said system further comprising a calculation element that calculates the number of times that indexing data for a particular web page is received at said search engine database.

19. A system for providing indexed web page contents to a search engine database, said system comprising:
- means for providing user access to said web page from a temporary copy of said web page which is stored on a device which accesses said web page and which is accessible to said user, in response to each user request for a web page;
- means for automatically recording indexing data at said device from said temporarily stored copy of said accessed web page, said indexing data corresponding to contents of said accessed web page; and means for transmitting said indexing data from said device to a remote data storage device which provides a search engine database, wherein said indexed data is incorporated into said search engine database.

20. The system for providing indexed web page contents to a search engine database according to claim 19, further comprising means for incorporating indexed web page contents into said search engine database, such that indexed web page contents are provided to a search engine database in response to a user access to said web page.

21. The system for providing indexed web page contents to a search engine database according to claim 19, said means for providing user access to a web page from a temporary copy of said web page further comprising:

means for searching a network through a server, wherein said server requests accesses to said user requested web page;

means for temporarily storing a copy of said user requested web page at said server, in response to receiving a copy of said web page at said server; and means for providing said user access to said temporarily stored copy of said user requested web page.

22. The system for providing indexing web page contents to a search engine database according to claim 19, said means for providing user access to a web page from a temporary copy of said web page, further comprising:

means for entering a user request for a web page to a browser, wherein said browser is an interface for a user to a network;

means for requesting said user requested web page from a network by said browser;

means for temporarily storing a copy of said user requested web page in a volatile storage accessible to said browser, in response to receiving a copy of said web page; and means for providing said user access to said temporarily stored copy of said user requested web page through said browser.

23. The system for providing indexed web page contents to a search engine database according to claim 19, said means for providing user access to a web page from a temporary copy of said web page, further comprising:

means for temporarily storing a copy of a user requested web page in a volatile storage of a distributed data processing system, in response to receiving a copy of said web page due to a user request.

24. The system for providing indexed web page contents to a search engine database according to claim 19, said means for providing user access to said web page from a temporary copy of said web page, further comprising:

means for accessing said web page from a network.

25. The system for providing indexed web page contents to a search engine database according to claim 19, said means for automatically recording indexing data at said device from said temporarily stored copy of said accessed web page, further comprising:

means for determining whether said device has high priority functions to perform; and means for retrieving said indexing data at said device from said temporarily stored copy of said accessed web page, in response determining that said device does not have high priority functions to perform.

26. A system for providing indexed file contents to a data storage system, said system comprising:

means for providing user access to said data file from a temporary copy of said data file stored on a device which accesses said data file and is accessible to said user, in response to each user request for a data file;

means for automatically recording indexing data at said device from said temporarily stored copy of said accessed data file, said indexing data corresponding to contents of said accessed data file; and means for transmitting said indexing data from said device to a remote data storage system.

27. The system for providing indexed file contents to a data storage system according to claim 26, said system further comprising means for collecting indexed data file contents from a plurality of users at a remote data storage system in response to each user access to a data file.

28. The system for providing indexed file contents according to claim 26, wherein said remote data storage system comprises a search engine database system.

29. The system for indexing web page contents according to claim 28, said system further comprising a web browser for providing user access to said temporary copy of said accessed web page.

* * * * *